United States Patent
Bittar et al.

(10) Patent No.: US 9,612,355 B2
(45) Date of Patent: Apr. 4, 2017

(54) IMAGING AND SENSING OF SUBTERRANEAN RESERVOIRS

(75) Inventors: Michael S. Bittar, Houston, TX (US); Burkay Donderici, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 120 days.

(21) Appl. No.: 13/809,100

(22) PCT Filed: Jul. 9, 2010

(86) PCT No.: PCT/US2010/041529
§ 371 (c)(1),
(2), (4) Date: Mar. 19, 2013

(87) PCT Pub. No.: WO2012/005737
PCT Pub. Date: Jan. 12, 2012

(65) Prior Publication Data
US 2013/0169278 A1    Jul. 4, 2013

(51) Int. Cl.
*G01V 3/30* (2006.01)

(52) U.S. Cl.
CPC .................................. *G01V 3/30* (2013.01)

(58) Field of Classification Search
CPC ...... E21B 47/00; E21B 47/0002; E21B 47/01; E21B 44/00; E21B 49/00; E21B 47/011; E21B 47/022; E21B 47/0001; E21B 47/12; E21B 47/121; E21B 47/122; E21B 49/001; E21B 49/003; E21B 49/005; E21B 47/02216; E21B 47/02224; E21B 7/04; E21B 7/043; E21B 7/046; E21B 7/06; G01V 11/002; G01V 3/00; G01V 3/02; G01V 3/04; G01V 3/06; G01V 3/08; G01V 3/081; G01V 3/083; G01V 3/084; G01V 3/085; G01V 3/086; G01V 3/087; G01V 3/088; G01V 3/165; G01V 3/26; G01V 3/30; G01V 3/40; G01V 11/007; G01V 2210/54;
(Continued)

(56) References Cited

U.S. PATENT DOCUMENTS 1,724,794 A    8/1929   Davis
4,875,015 A   10/1989   Ward
(Continued)

FOREIGN PATENT DOCUMENTS

DE              331426       1/1921
WO    WO-2012005737 A1      1/2012

OTHER PUBLICATIONS

"International Application Serial No. PCT/US2010/041529, International Search Report mailed Jul. 26, 2011", 5 pgs.
(Continued)

*Primary Examiner* — Melissa Koval
*Assistant Examiner* — Felicia Farrow
(74) *Attorney, Agent, or Firm* — Gilliam IP PLLC (57) ABSTRACT

Various embodiments include apparatus and methods of sensing and/or mapping a subterranean reservoir. In various embodiments, arrangements of electromagnetic sensors are disposed relative to a subterranean reservoir such that a signal received by electromagnetic sensors of one arrangement, in response to activation of an electromagnetic transmitter, can be analyzed to map the subterranean reservoir. Additional apparatus, systems, and methods are disclosed.

35 Claims, 6 Drawing Sheets

(58) Field of Classification Search
CPC ......... G01V 2210/542; G01V 2210/55; G01V 2210/1216; G01R 33/02; G01C 17/00; G01N 27/00; G01N 33/24; G01N 33/241; E02D 1/00
USPC ....................................................... 324/338
See application file for complete search history.

(56) References Cited

U.S. PATENT DOCUMENTS

| | | | |
|---|---|---|---|
| 5,042,611 | A | 8/1991 | Howlett |
| 5,151,658 | A | 9/1992 | Muramatsu et al. |
| 5,481,501 | A | 1/1996 | Blakeslee et al. |
| 5,597,042 | A | 1/1997 | Tubel et al. |
| 5,662,165 | A | 9/1997 | Tubel et al. |
| 5,730,219 | A | 3/1998 | Tubel et al. |
| 5,892,362 | A | 4/1999 | Warren et al. |
| 5,926,437 | A | 7/1999 | Ortiz |
| 6,006,832 | A | 12/1999 | Tubel et al. |
| 6,065,538 | A | 5/2000 | Reimers et al. |
| 6,181,138 | B1* | 1/2001 | Hagiwara et al. ............ 324/338 |
| 6,209,640 | B1 | 4/2001 | Reimers et al. |
| 6,302,204 | B1 | 10/2001 | Reimers et al. |
| 6,388,947 | B1 | 5/2002 | Washbourne et al. |
| 6,497,457 | B1 | 12/2002 | Stolarczyk |
| 6,534,986 | B2 | 3/2003 | Nichols |
| 6,896,074 | B2 | 5/2005 | Cook et al. |
| 7,095,233 | B1 | 8/2006 | Tabanou et al. |
| 7,453,768 | B2 | 11/2008 | Hall et al. |
| 2003/0075361 | A1 | 4/2003 | Terry et al. |
| 2004/0090230 | A1* | 5/2004 | Appel et al. ................. 324/307 |
| 2008/0217057 | A1 | 9/2008 | Hall et al. |
| 2009/0039889 | A1 | 2/2009 | Wilt et al. |
| 2009/0179649 | A1 | 7/2009 | Schmidt et al. |
| 2009/0272531 | A1 | 11/2009 | Montraon |
| 2010/0023268 | A1 | 1/2010 | Gold et al. |
| 2010/0271030 | A1* | 10/2010 | Reiderman et al. .......... 324/338 |
| 2011/0309835 | A1* | 12/2011 | Barber et al. ................. 324/339 |

OTHER PUBLICATIONS

"International Application Serial No. PCT/US2010/041529, Invitation to Pay Additional Fee mailed May 20, 2011", 6 Pgs.

"International Application Serial No. PCT/US2010/041529, Written Opinion mailed Jul. 26, 2011", 8 pgs.

"International Application Serial No. PCT/US2010/041529, Written Opinion mailed Oct. 19, 2012", 5 pgs.

"Australian Application Serial No. 2010357213, Examination Report No. 1 mailed Jun. 4, 2013", 2 pgs.

"European Application Serial No. 10732816.3, Office Action mailed Feb. 15, 2013", 2 pgs.

"European Application Serial No. 10732816.3, Response filed Aug. 14, 2013 to Office Action mailed Feb. 15, 2013", 3 pgs.

"International Application Serial No. PCT/US2010/041529, International Preliminary Report on Patentability mailed on Jul. 15, 2013", 15 pgs.

"Australian Application Serial No. 2010357213, Response filed Nov. 5, 2013 to Examination Report No. 1 mailed Jun. 4, 2013", 19 pgs.

"Australian Application Serial No. 2010357213, Response filed May 16, 2014 to Subsequent Examiners Report mailed Nov. 20, 2013", 22 pgs.

"Australian Application Serial No. 2010357213, Subsequent Examiners Report mailed Nov. 20, 2013", 3 pgs.

"International Application Serial No. PCT/US2010/041529, Response filed May 8, 2012 to Written Opinion mailed Jul. 26, 2011", 9 pgs.

"Singaporean Application Serial No. 201300096-3, Examination Report mailed May 13, 2014", 6 pgs.

"European Application Serial No. 10732816.3, Office Action mailed Feb. 15, 2016", 6 pgs.

"European Application Serial No. 10732816.3, Communication pursuant to Article 94(3) EPC mailed Jul. 21, 2016", 4 pgs.

"European Application Serial No. 10732816.3, Response filed May 11, 2016 to Communication pursuant to Article 94(3) EPC mailed Feb. 15, 2016", 15 pgs.

* cited by examiner

IMAGING AND SENSING OF SUBTERRANEAN RESERVOIRS

RELATED APPLICATIONS

This application is a U.S. National Stage Filing under 35 U.S.C. 371 from International Application No. PCT/US2010/041529, filed on 9 Jul. 2010, and published as WO 2012/005737 A1 on 12 Jan. 2012, which application and publication are incorporated herein by reference in their entirety.

TECHNICAL FIELD

The invention relates generally to systems for conducting well operations.

BACKGROUND

In drilling wells for oil and gas exploration, understanding the structure and properties of the geological formation surrounding a borehole provides information to aid such exploration. However, the environment in which the drilling tools operate is at significant distances below the surface and measurements to manage operation of such equipment are made at these locations. Further, the usefulness of such measurements may be related to the precision or quality of the information derived from such measurements.

Remote sensing and evaluation of subterranean reservoirs has been important in oil exploration and production, since it provides important information that would otherwise be available by expensive drilling operations. The widest-scale remote sensing application is the seismic survey that is conducted from the surface to locate oil reservoirs. Although these surveys are important in developing drilling strategies, they only provide very coarse information that needs to be complemented by other shallower and more detailed evaluation tools that are located down-hole. As an example, downhole sensors placed in a vertical well can be included in addition to the sensors at the surface to achieve more effective sensing.

Many existing reservoir imaging and monitoring schemes operate in two configurations. The first configuration is a cross-well imaging configuration, in which the sensors are placed in multiple vertical wells and data is collected from the volume that is surrounded by these wells. The imaging is performed in between the vertical wells drilled at different locations surrounding the volume of interest. Developed first for conductivity mapping, these sensors have been extended to resistivity mapping. The second configuration is a surface configuration, where the transmitters and receivers are located at the surface or at very shallow depths. Although these configurations have been successfully used in imaging shallow reservoirs or reservoirs with simple geometry, they have exhibited difficulties in deeper and more complicated conditions. Further, since reservoirs that have been relatively easier to access have been drilled out in the past years, the industry is faced with reservoirs that are harder to explore and produce.

DETAILED DESCRIPTION

The following detailed description refers to the accompanying drawings that show, by way of illustration, various example embodiments of the invention. These embodiments are described in sufficient detail to enable those skilled in the art to practice these and other embodiments. Other embodiments may be utilized, and structural, logical, and electrical changes may be made to these embodiments. The various embodiments are not necessarily mutually exclusive, as some embodiments can be combined with one or more other embodiments to form new embodiments. The following detailed description and accompanying drawings are, therefore, not to be taken in a limiting sense.

Conventional methodologies based on surface or vertical-well sensors provide limited information, since the reservoirs of interest are located at very large depths away from the surface. Furthermore, multiple vertical wells are expensive to drill and only provide information from sides of the reservoir. Since most reservoirs have large horizontal cross-sections, imaging is complicated by the lack of a top or bottom sensor, which has been addressed by imaging from horizontally drilled wells. However, this approach is based on seismographs, which limits its use to boundary detection without any resistivity information.

Figure 1:
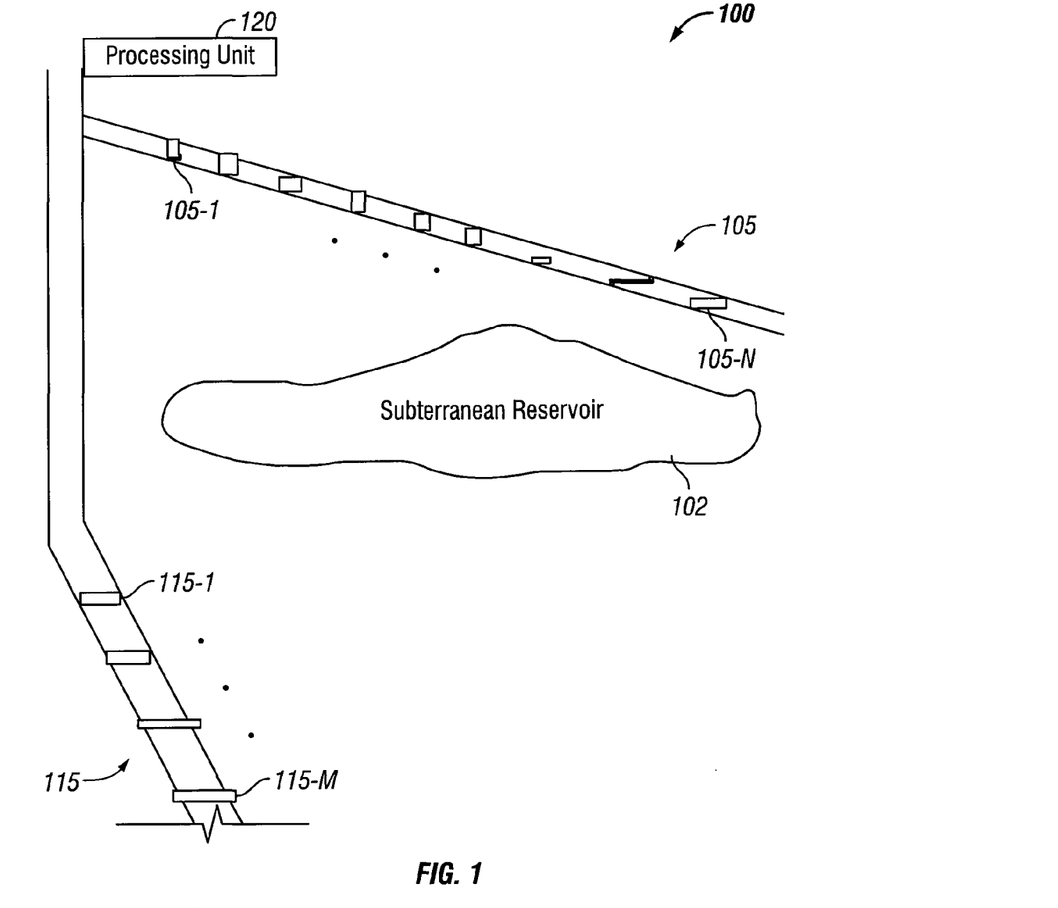
FIG. 1 illustrates an example arrangement for sensing and/or imaging of a subterranean reservoir, according to various embodiments.

FIG. 1 illustrates an example of an apparatus 100 structured to sense and/or map a subterranean reservoir 102. A mapping of subterranean reservoir 102 can be used to image subterranean reservoir 102. Arrangements of electromagnetic sensors relative to a subterranean reservoir are disposed such that a received signal in electromagnetic sensors of one arrangement, in response to activation of an electromagnetic sensor in another arrangement, can be analyzed to sense and/or map the subterranean reservoir. Apparatus 100 can include a first arrangement 105 of electromagnetic sensors 105-1 . . . 105-N disposed along a first direction below earth's surface and a second arrangement 115 of electromagnetic sensors 115-1 . . . 115-M disposed along a second direction below earth's surface, where the second direction is different from the first direction. The first direction may be substantially along on one plane and the second direction may be substantially along a different plane. Such directions may be arranged in a non-parallel configuration, where the angle of intersection is not limited to a particular angle. The two directions may be arranged at about ninety degrees with respect to each other. A configuration of arrangements on different sides of subterranean reservoir 102 can provide a mechanism to generate an enhancement image of subterranean reservoir 102. In addition, N may be a number different from M, but N may be equal M. Apparatus 100 can also include a processing unit 120 structured to analyze signals received at first arrangement 105 in response to signals transmitted from second arrangement 115 and to generate a map of subterranean reservoir 102 from the analysis.

From signals received at electromagnetic sensors in response to activating other electromagnetic sensors, processing unit 120 can apply standard inversion techniques to the signals or representations from these signals to generate information on the subterranean region of interest. In addition, processing unit 120 can include instrumentality to analyze received signals from probing subterranean reservoir 102 and formation layers around subterranean reservoir 102 to sense the subterranean reservoir, determine characteristics of the formation layers, extract properties of the subterranean reservoir, map the subterranean reservoir, generate an image of the subterranean reservoir, and direct drilling operations. The instrumentality can be realized in hardware implementations, software implementations, and combinations of hardware and software implementations. Some portions of the instrumentalities may be described in terms of algorithms and symbolic representations of operations on data bits within a machine memory. An algorithm is herein, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. The instrumentality may operate to process, compute, calculate, determine, display, and/or conduct other activities correlated to processes of a machine, such as a computer system or similar electronic computing device, that manipulates and transforms data represented as physical (electronic) quantities within the machine's registers and memories into other data similarly represented as physical quantities within the machine's memories or registers or other such information storage or display devices. The instrumentality may provide a pathway to other content. The instrumentality may use distributed applications, different numbers and types of software based components that couple two or more applications to enable data transfer between the applications, hardware to provide services from a number of different sources, and may be realized on a variety of platforms.

Electromagnetic sensors include devices that receive or transmit electric, magnetic, or electromagnetic signals. In various embodiments, electromagnetic sensors can be realized as electric dipole receivers, magnetic dipole receivers, electric dipole transmitters, magnetic dipole transmitters, or combinations thereof. Sensor types can include magnetic dipoles that can be realized by coils or magnetometers, and electric dipoles that can be realized by wires, toroids, or electrodes. The transmitters and/or receivers can each be realized as a transceiver. Other sensor types may be used.

Arrangements of electromagnetic sensors to sense and/or map a subterranean reservoir can be configured in a number of ways. An arrangement can include an array of physical electromagnetic sensors, an array of synthetically produced electromagnetic sensors, or an array of a combination of physical electromagnetic sensors and synthetically produced electromagnetic sensors. An array of synthetic electromagnetic sensors can be realized by moving a single or multiple array elements to different locations over time. Using multiple arrangements, a first arrangement can include magnetic dipole sensors and a second arrangement can include magnetic dipole sensors. A first arrangement can include electric dipole sensors and a second arrangement can include magnetic dipole sensors. A first arrangement can include electric dipole sensors and a second arrangement can include electric dipole sensors. A first arrangement can include magnetic dipole sensors and a second arrangement can include electric dipole sensors. One or both of two arrangements can include both electric dipole sensors and magnetic dipole sensors. The number of different arrangements of electromagnetic sensors of a tool to image and/or sense a subterranean reservoir is not limited to two arrays of sensors.

In addition to configuring the types of electromagnetic sensors in each arrangement, each arrangement can be disposed in boreholes oriented with respect to each other and/or a subterranean reservoir of interest in a number of different ways. A first arrangement utilized to receive signals in response to signals transmitted from a second arrangement, can be disposed above the subterranean reservoir. A first arrangement can be disposed substantially horizontally relative to the earth's surface and a second arrangement can be disposed substantially horizontally relative to the earth's surface. A first arrangement can be disposed substantially horizontally relative to the earth's surface and a second arrangement can be disposed substantially vertically relative to the earth's surface. A first arrangement and a second arrangement can be oriented such that the electromagnetic sensors of the first arrangement have electric and/or magnetic dipoles having an orientation that is the same as the orientation of electric and/or magnetic dipoles of the electromagnetic sensors of the second arrangement. The orientation may be normal to formation layers.

Figure 2:
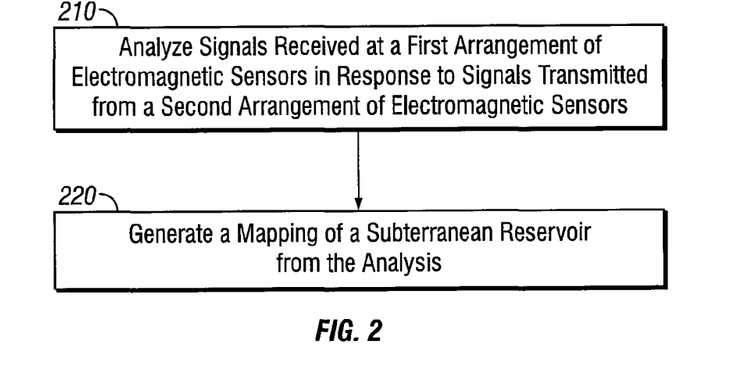
FIG. 2 shows features of an example method of sensing and/or imaging a subterranean reservoir, according to various embodiments.

FIG. 2 shows features of an example embodiment of a method of sensing and/or imaging a subterranean reservoir. At 210, signals received at a first arrangement of electromagnetic sensors are analyzed, where the received signals are in response to signals transmitted from a second arrangement of electromagnetic sensors. The first arrangement can be disposed along a first direction below earth's surface and the second arrangement can be disposed along a second direction below earth's surface, where the second direction is different from the first direction. A transmitter in the second arrangement of electromagnetic sensors can be activated with remaining transmitters in the second arrangement of electromagnetic sensors un-activated. A received signal, such as a voltage, can be measured at each receiver in the first arrangement of electromagnetic sensors in response to the one activated transmitter in the second arrangement. The remaining transmitters in the second arrangement can each be activated with the other transmitters in the second arrangement of electromagnetic sensors un-activated and each receiver in the first arrangement can be addressed to measure the respective responses due to the activation.

In various embodiments, transmitting sensors may be distributed among two or more arrangements of directions of electromagnetic sensors with receiving sensors distributed among these two or more arrangements. Each transmitter can be individually activated, where each receiver, in a set of receivers, measures a signal in response to each activation. The set may include all the receivers in these two or more arrangements.

Instructions executed by a processor can be applied to extract parameters of the subterranean reservoir using the signals received at the first arrangement. Instructions executed by a processor can be applied to measure and/or validate formation properties. Information, generated from inversion techniques applied in the analysis of the received signals, can be used in controlling and directing a drilling operation for a borehole.

At 220, a map of a subterranean reservoir is generated from the analysis. Within the subterranean reservoir, different regions can be mapped based on characteristics obtained in the inversion and analysis of signals received in response to probe signals. The map may be generated as sets of coordinates effectively identifying various regions within the boundaries of the subterranean reservoir. Such a map or maps can be imaged on a display. Various conventional methods can be used to enhance the imaging of the subterranean reservoir, based on processed signals from arrangements of sensors.

In various embodiments, a fluid can be injected into the subterranean reservoir such that effects of the fluid on the subterranean reservoir can be monitored. Such a fluid can be a contrast fluid. The fluid can be a conductive fluid or a magnetic fluid. The fluid can also be a ferrofluid. A ferrofluid is a liquid that contains nanoscale ferromagnetic particles or ferromagnetic particles that are suspended in a carrier fluid. A ferrofluid can be designed to possess extraordinary electromagnetic properties. A ferrofluid also has the capability, both electromagnetically and mechanically, to react to applied magnetic fields. In reservoir imaging by an electromagnetic probe, a fluid can be injected into the reservoir to increase or decrease the reservoir resistivity such that enhanced contrast with the formation is created. Injection of a fluid can be used in well applications, where imaging is difficult, such as water bearing reservoirs. During and after a fluid injection, movement of the fluid within the reservoir can be tracked with respect to time to reveal additional information about the reservoir characteristics. In addition, the distribution of the fluid can be remotely altered by means of an applied electromagnetic field to further assist in sensing and imaging.

Figure 3:
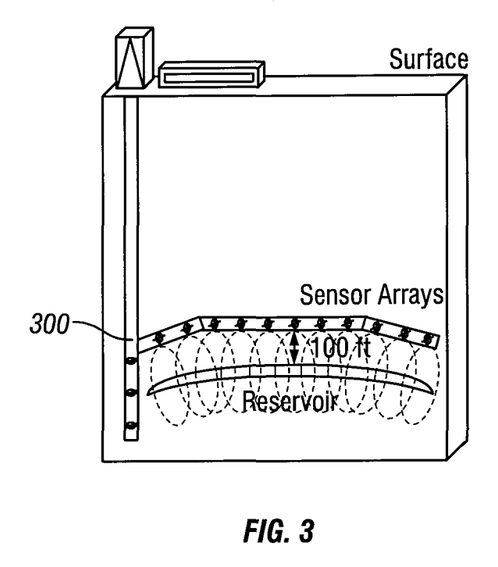
FIG. 3 illustrates an example arrangement for sensing and/or imaging of a subterranean reservoir, according to various embodiments.

In various embodiments, an array of electromagnetic sensors is utilized, located at a horizontal well branch or a plurality of horizontal well branches, which are placed in the vicinity of a reservoir. FIG. 3 illustrates an example embodiment of placement 300 of an array of electromagnetic sensors in a horizontal well. The horizontal well is placed at fixed distance from the pay zone to monitor and evaluate the movement of fluids within the reservoir during the production phase. A pay zone is a portion of a reservoir that contains economically producible hydrocarbons. In some instances, the pay zone may be the entirety of the reservoir. A fluid may be injected into the reservoir to produce higher contrast between the reservoir and the formation. The same tool, having the array of electromagnetic sensors, can be used to place the well in an optimal position near the reservoir.

Figure 4:
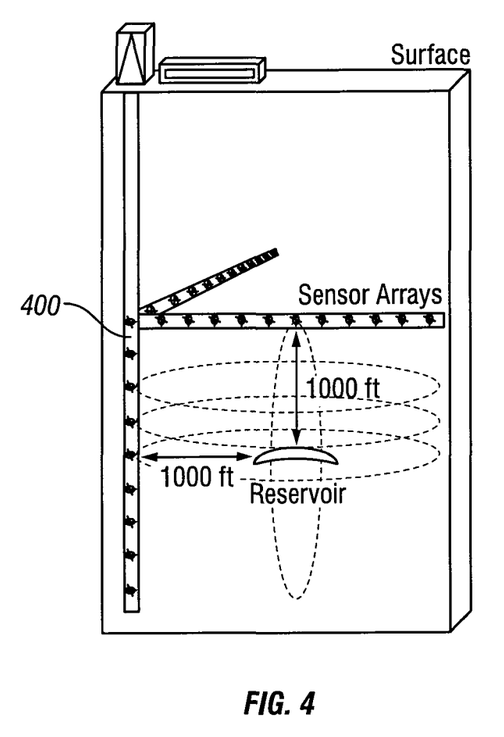
FIG. 4 illustrates an example arrangement for sensing and/or imaging of a subterranean reservoir, according to various embodiments.

FIG. 4 illustrates an embodiment of an example placement 400 of a longer horizontal well section surrounding the zone suspected of containing a reservoir than placed in FIG. 3. The longer horizontal well sections of FIG. 4 may be at significantly larger distances from a reservoir than the horizontal well sections of FIG. 3. For example, the distances of 1000 ft shown in FIG. 4 are ten times larger as compared to 100 feet shown in FIG. 3. Such configurations may have the capability to provide deep sensing of reservoirs; deep evaluation of reservoir parameters including depth, orientation, length and resistivity information; an optimal horizontal wellbore placement; detailed production monitoring with temporary or permanent sensors; and enhanced recovery of hydrocarbons as compared to existing reservoir imaging and monitoring schemes.

Figure 5:
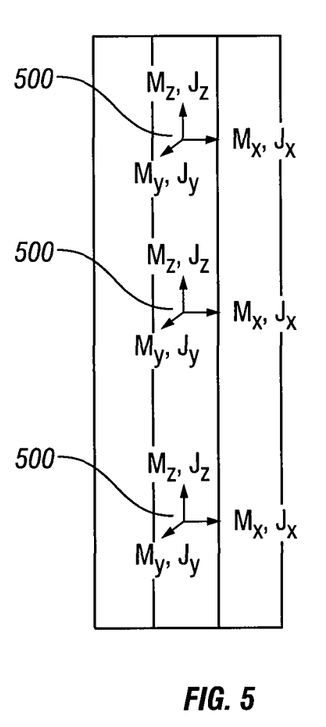
FIG. 5 depicts an example of an array placement, according to various embodiments.
Figure 6:
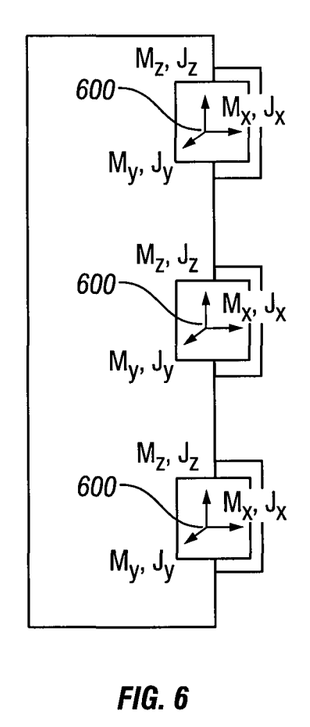
FIG. 6 depicts an example of a buried array placement, according to various embodiments.

In various embodiments, a tool includes an array that is composed of a combination of multi-component magnetic and electric dipoles. The magnetic dipoles can be effectively realized by coils or magnetometers, while the electric dipoles can be realized by wires, toroids, or electrodes. As shown in FIG. 5, array elements 500 can be placed on a drill string, where they can be operated while drilling in a logging-while-drilling (LWD) or measuring-while-drilling (MWD) setting. Alternatively, as shown in FIG. 6, array elements 600 can be buried along the borehole in a permanent configuration. Magnetization components ($M_x$, $M_y$, and $M_z$) and current density components ($J_x$, $J_y$, and $J_z$) of a multi-component array do not need to be collocated. In addition, the components can be placed in any ordering along the tool. In various embodiments, the sensor array includes both transmitters and receivers. However, various configurations can be eliminated (not used) to reduce the number of antennas in the setup.

Multiple array components can be composed of a physical array of sensor elements and/or produced synthetically by moving a single array element or multitude of array elements to different locations in time. A production monitoring application may be more suitable for using the physical array of sensor elements, while a LWD/MWD application may be more suitable for the synthetically produced multiple array components. Data can be collected by switching on each transmitter and measuring the voltage at each receiver. This information can be stored temporarily and passed to the surface via a telemetry system. Alternatively, the information may be processed down hole and the processed information can be transmitted to the surface. Such tools can operate over a frequency range from 0.01 Hz to 100 KHz. Operation of the tool can be conducted at other frequencies.

Figure 7:
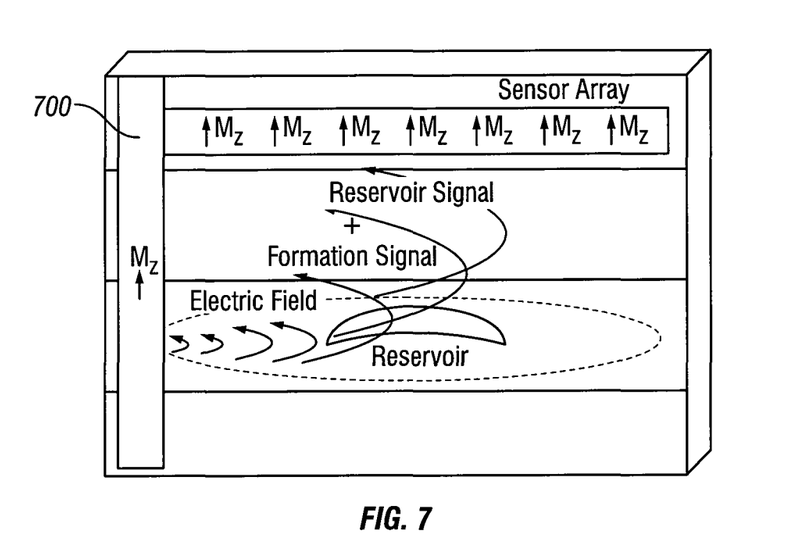
FIG. 7 illustrates an example of an arrangement of magnetic transmitters and magnetic receivers, according to various embodiments.

In a configuration for investigations deep below the surface, transmitters and corresponding receivers can be chosen from different arrays. FIG. 7 illustrates an example embodiment of an arrangement 700 with a magnetic dipole transmitter in a vertical well and a magnetic dipole receiver in the horizontal well. In the example case shown in FIG. 7, the received signal is composed of both the signal that is directly coming from the transmitter through the formation (the formation signal) as well as the signal coming via the reservoir (the reservoir signal). This configuration can be used for measuring or validating the formation properties, such as depth and resistivity of formation layers. Reservoir parameters can be extracted from this configuration through a numerical inversion phase.

Figure 8:
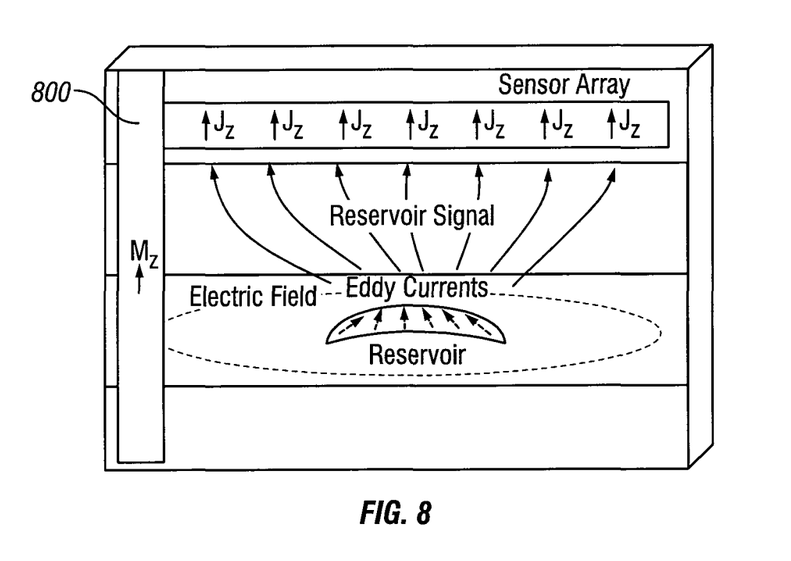
FIG. 8 illustrates an example of an arrangement of transmitters and receivers relative to eddy currents in a reservoir, according to various embodiments.

FIG. 8 shows an example embodiment of a transmitter excitation configuration 800, where a magnetic dipole transmitter and an electric dipole receiver with the same orientation are used. In this configuration, the directionality of the dipoles is chosen or set normal to the layers in the formation, so that a direct signal from the transmitter to the receivers is zeroed out, regardless of the number of formation layers and their electrical properties. This configuration allows an independent measurement of reservoir properties by decoupling the eddy currents formed at dipping reservoir features from complicating the direct formation signal. This decoupling allows for easier inversion of various reservoir parameters.

In various embodiments, multiple arrays can be placed in multiple wellbores, which are a combination of both vertical and horizontal wells. The horizontal wells may be formed as a lateral branch of the vertical well by drilling horizontally at a predetermined depth. In reservoir imaging, by taking advantage of the distance to reservoir provided by processing the measurements from the arrays of the imaging/sensing tool as the drilling is being performed, the horizontal section of the well can be drilled at fixed distance from the reservoir. This distance can be kept short for more shallow and detailed evaluation, and it can be kept long for deeper more coarse evaluation. For a reservoir sensing application, a longer well section can be placed at a more distant depth to the evaluation zone. The typical distance in a reservoir monitoring application is about 100 feet, while this distance in a sensing or evaluation application ranges from about 1000 to about 2000 feet. Monitoring and/or sensing can be realized at other distances.

In various embodiments, a tool having multiple arrangements of electromagnetic sensors can be configured to shorten the evaluation distance to a volume of interest. The spatial characteristics of the multiple arrangements of the tool can provide diverse spatial information for deep and detailed sensing and for the evaluation and monitoring of reservoirs. In contrast to schemes based on multiple vertical wells, in-depth cross-well evaluation can be achieved by placing arrays of sensors of the tool in both vertical wells and horizontal sections branching from the vertical wells. This configuration of the arrangements of sensors allows for enhanced spatially diverse information and imaging of the volume that lies in between different branches. Furthermore, unlike schemes based on surface sensors, all sensor components of the tool can reside deep in the vicinity of the reservoir, where more focused and detailed evaluation is possible. By processing the information provided by combination of all array components, the tool provides depth, orientation, length, and resistivity information for the reservoirs.

In various embodiments, a method of analyzing a subterranean reservoir can include injecting a contrast fluid into the subterranean reservoir, such that effects of the contrast fluid on signals transmitted through or via the subterranean reservoir can be observed by a sensor. The contrast fluid can include nanoscale ferromagnetic particles. The contrast fluid may be a ferrofluid. A ferrofluid can be injected into the subterranean reservoir such that resistivity of the subterranean reservoir changes sufficiently to enhance contrast of the subterranean reservoir with respect to adjacent subterranean formations when analyzing signals received at the sensor from a transmitter. The contrast fluid, whether a ferrofluid or other appropriate fluid with contrast characteristics, can be tracked such that tracking movement of the contrast fluid within the subterranean reservoir can be conducted with respect to time. Information about characteristics of the subterranean reservoir can be determined from the tracked contrast fluid. Further, conducting the analysis can include altering the distribution of the contrast fluid within the subterranean reservoir by applying an electromagnetic field to the contrast fluid.

Figure 9:
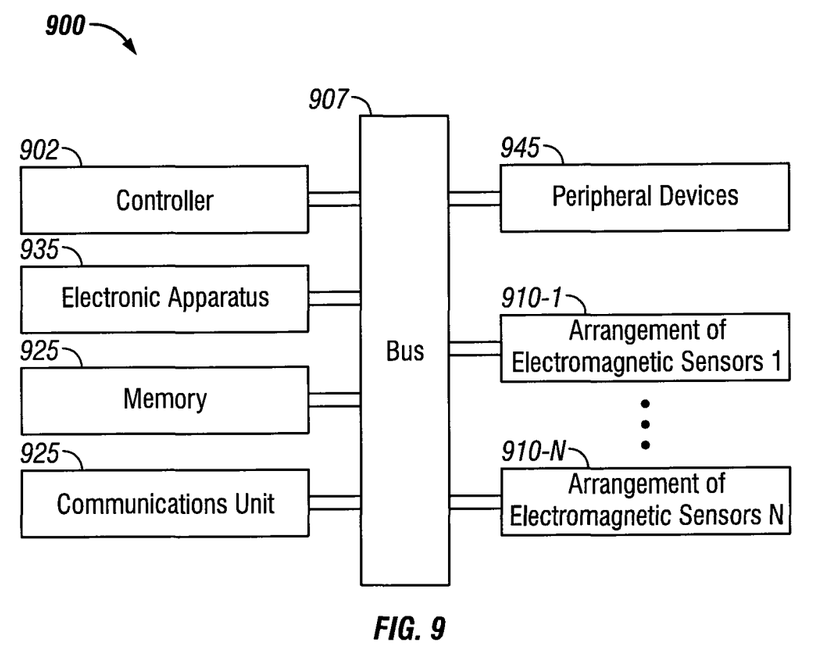
FIG. 9 depicts a block diagram of features of an embodiment of a system having two or more arrangements of electromagnetic sensors to sense and/or image a subterranean reservoir, according to various embodiments.

FIG. 9 depicts a block diagram of features of an embodiment of a system 900 having two or more arrangements 910-1 . . . 910-N of electromagnetic sensors to sense and/or image a subterranean reservoir. Arrangements 910-1 . . . 910-N of electromagnetic sensors can be structured and fabricated in accordance with various embodiments as taught herein.

System 900 can also include a controller 902, a memory 925, an electronic apparatus 935, and a communications unit 955. Various combinations of controller 902, memory 925, and communications unit 955 can be arranged to operate as a processing unit for a sensor tool to operate arrangements 910-1 . . . 910-N. Such a processing unit can process signals from one or more arrangements 910-1 . . . 910-N. The signals can be converted to properties of formation layers and of a subterranean reservoir using standard inversion techniques.

Memory 925 and/or one or more components of system 900 can include instructions to operate a tool, including two or more arrangements 910-1 . . . 910-N, to monitor and/or sense a subterranean reservoir. Other machine-readable storage media can be used, where the machine-readable storage media stores instructions, which when read by a machine, cause the machine to perform operations to sense and/or image a subterranean reservoir. Such operations, can include but are not limited to, analyzing signals received at a first arrangement of electromagnetic sensors in response to signals transmitted from a second arrangement of electromagnetic sensors, where the first arrangement is disposed along a first direction below earth's surface and the second arrangement is disposed along a second direction below earth's surface such that the second direction different from the first direction. The instructions can include generating a map of a subterranean reservoir from the analysis. The instructions can include activating a transmitter in the second arrangement of electromagnetic sensors with remaining transmitters in the second arrangement of electromagnetic sensors un-activated. The instructions can include measuring a voltage at each receiver in the first arrangement of electromagnetic sensors, for each activation of a transmitting sensor. The instructions can include extracting parameters of the subterranean reservoir using the signals received at the first arrangement. The instructions can include directing the operations of drilling operations relative to the monitored and/or sensed subterranean reservoir. The machine readable storage medium may include other instructions to operate a tool including two or more arrangements 910-1 . . . 910-N to monitor, sense, map, and/or image the subterranean reservoir in accordance with embodiments similar to or identical to embodiments discussed herein.

Portions or all of controller 902, memory 925, and communications unit 955 can be structured to operate located downhole. Communications unit 955 can include downhole communications in a drilling operation. Such downhole communications can include a telemetry system. Communications unit 955 may be coupled to a communication line to provide measurement results to the surface of a well with arrangements 910-1 . . . 910-N located at significant distances from the surface.

System 900 can also include a bus 907, where bus 907 provides electrical conductivity among the components of system 900. Bus 907 can include an address bus, a data bus, and a control bus, each independently configured. Bus 907 can also use common conductive lines for providing one or more of address, data, or control, the use of which is regulated by controller 902. Bus 907 can be configured such that the components of system 900 are distributed. Such distribution can be arranged between downhole components such as two or more arrangements 910-1 . . . 910-N and surface components such as a processing unit arranged as one or more components of controller 902, a memory 925, an electronic apparatus 935, and peripheral devices 945 of system 900. Alternatively, the components controller 902, a memory 925, an electronic apparatus 935, and portions of peripheral devices 945 can be co-located such as on one or more collars of a drill string structure.

In various embodiments, peripheral devices 945 include displays, additional storage memory, and/or other control devices that may operate in conjunction with controller 902 and/or memory 925. In an embodiment, controller 902 is a processor. A peripheral device arranged as a display can be used with instructions stored in memory 925 to implement a user interface to manage the operation of arrangements 910-1 . . . 910-N in system 900 and/or components distributed within system 900.

Figure 10:
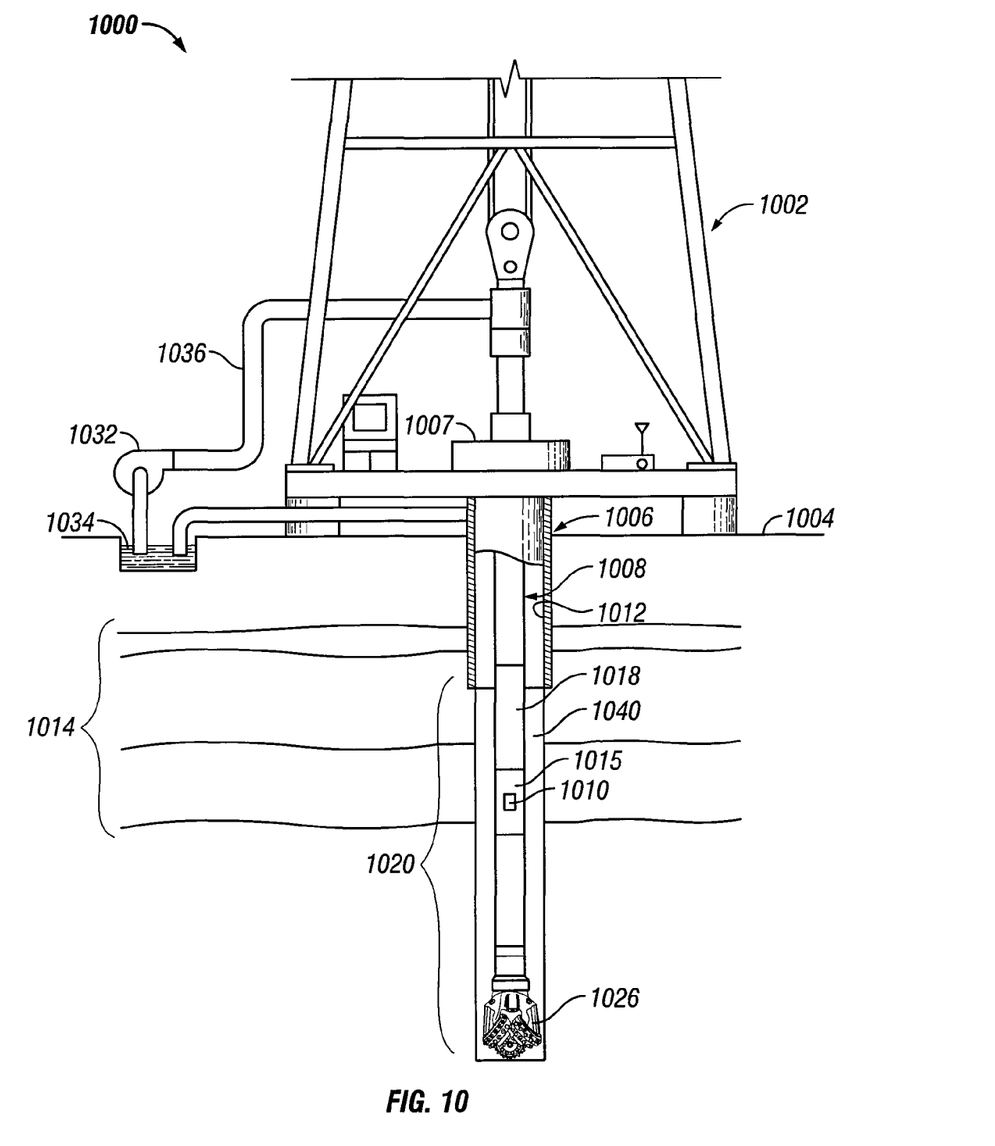
FIG. 10 depicts an embodiment of a system at a drilling site, according to various embodiments.

FIG. 10 depicts an embodiment of a system 1000 at a drilling site, where system 1000 includes a tool to monitor, sense, map, and/or image the subterranean reservoir. The tool includes two or more arrangements of electromagnetic sensors, as taught herein, that extend from a drill string 1008. The two or more arrangements of electromagnetic sensors are not shown for ease of presentation. However, examples of such extensions can be seen in FIGS. 1, 3, 4, 7, and 8.

System 1000 can include a drilling rig 1002 located at a surface 1004 of a well 1006 and a string of drill pipes, that is, drill string 1008, connected together so as to form a drilling string that is lowered through a rotary table 1007 into a wellbore or borehole 1012. Drilling rig 1002 can provide support for drill string 1008. Drill string 1008 can operate to penetrate rotary table 1007 for drilling a borehole 1012 through subsurface formations 1014. Drill string 1008 can include drill pipe 1018 and a bottom hole assembly 1020 located at the lower portion of drill pipe 1018.

Bottom hole assembly 1020 can include drill collar 1015, tool control 1010 attached to drill collar 1015, and a drill bit 1026. Tool control 1010 can include electronics for operating two or more arrangements of electromagnetic sensors. Such electronics can include a processing unit to analysis signals sensed by the two or more arrangements of electromagnetic sensors and provide measurement results to the surface over standard communication mechanism for operating a well. Alternatively, electronics can include a communications interface to provide signals sensed by the two or more arrangements of electromagnetic sensors to the surface over standard communication mechanism for operating a well, where these sensed signals are analyzed at a processing unit at the surface. Tool control 1010 or portions of tool control 1010 can be located at surface 1004. Drill bit 1026 can operate to create a borehole 1012 by penetrating surface 1004 and subsurface formations 1014. Tool control 1010 can be structured for an implementation in the borehole of a well as a measurements-while-drilling (MWD) system such as a logging-while-drilling (LWD) system.

During drilling operations, drill string 1008 can be rotated by rotary table 1007. In addition to, or alternatively, bottom hole assembly 1020 can also be rotated by a motor (e.g., a mud motor) that is located downhole. Drill collars 1015 can be used to add weight to drill bit 1026. Drill collars 1015 also can stiffen bottom hole assembly 1020 to allow bottom hole assembly 1020 to transfer the added weight to drill bit 1026, and in turn, assist drill bit 1026 in penetrating surface 1004 and subsurface formations 1014.

During drilling operations, a mud pump 1032 can pump drilling fluid (sometimes known by those of skill in the art as "drilling mud") from a mud pit 1034 through a hose 1036 into drill pipe 1018 and down to drill bit 1026. The drilling fluid can flow out from drill bit 1026 and be returned to surface 1004 through an annular area 1040 between drill pipe 1018 and the sides of borehole 1012. The drilling fluid may then be returned to mud pit 1034, where such fluid is filtered. In some embodiments, the drilling fluid can be used to cool drill bit 1026, as well as to provide lubrication for drill bit 1026 during drilling operations. Additionally, the drilling fluid may be used to remove subsurface formation 1014 cuttings created by operating drill bit 1026.

In various embodiments, a tool having multiple arrangements of electromagnetic sensors can also assist in directional drilling of the horizontal section. A horizontal section can be guided to be at a fixed distance from the reservoir, where permanent sensors are placed along the borehole for effective and sustained production monitoring. This monitoring allows enhanced recovery of hydrocarbons and better utilization of available resources. In another embodiment, a horizontal section can be placed at a relatively optimal distance to a target evaluation zone where most effective sensing is possible. In addition, various configurations for a tool having multiple arrangements of electromagnetic sensors can be operated with a ferrofluid that is injected into the reservoir for producing enhanced electromagnetic contrast. As discussed herein, a tool having multiple arrangements of electromagnetic sensors can offer deep sensing of reservoirs; can allow deep evaluation of reservoirs including evaluation of reservoir geometry including depth, orientation, length and resistivity information; can assist in optimal horizontal wellbore placement; can enable detailed and sustained well-production monitoring with temporary or permanent sensors; and can provide enhanced recovery of hydrocarbons.

Although specific embodiments have been illustrated and described herein, it will be appreciated by those of ordinary skill in the art that any arrangement that is calculated to achieve the same purpose may be substituted for the specific embodiments shown. Various embodiments use permutations and/or combinations of embodiments described herein. It is to be understood that the above description is intended to be illustrative, and not restrictive, and that the phraseology or terminology employed herein is for the purpose of description. Combinations of the above embodiments and other embodiments will be apparent to those of skill in the art upon studying the above description.

What is claimed is:

1. An apparatus comprising:
 a tool having electromagnetic sensors such that all electromagnetic sensors of the tool are structured as arrangeable and operable below earth's surface;
 a first arrangement of electromagnetic sensors of the tool arrangeable in and along a subterranean path which extends, at least in part, in a first direction;
 a second arrangement of electromagnetic sensors of the tool arrangeable in and along another subterranean path which extends, at least in part, in a second direction, the second direction being different from the first direction, the first arrangement and the second arrangement structured as arrangeable in different non-vertical branches of a common vertical well extending from the common vertical well or the first arrangement and the second arrangement structured as arrangeable with one of the first arrangement or the second arrangement structured in a non-vertical branch of the common vertical well extending from the common vertical well and the other one of the first arrangement or the second arrangement extending vertically within the common vertical well, and the first arrangement and the second arrangement being operable to receive a transmitted signal to acquire sensing and/or mapping information with respect to a subterranean reservoir; and
 a processing unit arranged to operate the first and second arrangements to choose a set of transmitting sensors and a set of receiving sensors from the electromagnetic sensors of the first and second arrangements such that a signal is received in the set of receiving sensors in one of the first or second arrangement in response to activation of the set of transmitting sensors in the other one of the first or second arrangement, wherein the electromagnetic sensors of the first arrangement have electric or magnetic dipoles arranged, when the first arrangement is disposed along the first subterranean path, to have a predetermined or selectable orientation and the electromagnetic sensors of the second arrangement have electric or magnetic dipoles arranged, when the second arrangement is disposed along the second subterranean path, to have the orientation of the electric or magnetic dipoles of the first arrangement.

2. The apparatus of claim 1, wherein both the set of transmitting sensors and the set of receiving sensors include a combination of multi-component magnetic dipoles and electric dipoles.

3. The apparatus of claim 1, wherein the processing unit is structured to analyze signals received at the first arrangement in response to signals transmitted from the second arrangement and to generate a map of the subterranean reservoir from the analysis.

4. The apparatus of claim 1, wherein the first arrangement includes an array of physical electromagnetic sensors, a synthetic array of electromagnetic sensors, or a combination of an array of physical electromagnetic sensors and a synthetic array of electromagnetic sensors.

5. The apparatus of claim 1, wherein the first arrangement includes magnetic dipole sensors and the second arrangement includes magnetic dipole sensors, and/or the first arrangement includes electric dipole sensors and the second arrangement includes electric dipole sensors.

6. The apparatus of claim 1, wherein the first arrangement includes electric dipole sensors and the second arrangement includes magnetic dipole sensors or the first arrangement includes magnetic dipole sensors and the second arrangement includes electric dipole sensors.

7. The apparatus of claim 1, wherein the first arrangement is disposed along a subterranean path which at least partly extends above the subterranean reservoir.

8. The apparatus of claim 1, wherein: the first arrangement is disposed along a path which extends substantially parallel either to the earth's surface or to layers of the subterranean formation in which the path extends; and the second arrangement is disposed along a path which extends substantially parallel either to the earth's surface or to layers of the subterranean formation in which the path extends.

9. The apparatus of claim 1, wherein: the first arrangement is disposed along a path which extends substantially parallel to the earth's surface or to layers of the subterranean formation in which the path extends; and the second arrangement is disposed substantially vertically.

10. The apparatus of claim 1, wherein the orientation is normal to layers of the subterranean formation in which the subterranean path of the first arrangement or the subterranean path of the second arrangement extends.

11. A method comprising:
choosing a set of transmitting sensors and a set of receiving sensors from a first arrangement of electromagnetic sensors and a second arrangement of electromagnetic sensors of a tool such that the electromagnetic sensors of the first arrangement have electric or magnetic dipoles arranged to have a predetermined or selectable orientation and the electromagnetic sensors of the second arrangement have electric or magnetic dipoles arranged to have the orientation of the electric or magnetic dipoles of the first arrangement;
activating the set of transmitting sensors;
receiving signals in the set of receiving sensors in the first arrangement of electromagnetic sensors in response to activation of the set of transmitting sensors in the second arrangement of electromagnetic sensors;
analyzing signals received at the set of receiving sensors of the first arrangement of electromagnetic sensors of the tool in response to signals transmitted from the set of transmitting sensors of the second arrangement of the tool such that all electromagnetic sensors and transmitters of the tool are disposed below earth's surface, the first arrangement being disposed in and along a subterranean path which extends, at least in part, in a first direction and the second arrangement being disposed in and along another subterranean path which extends, at least in part, in a second direction, the second direction being different from the first direction, the first arrangement and the second arrangement being disposed in different non-vertical branches of a common vertical well extending from the common vertical well or the first arrangement and the second arrangement structured being disposed with one of the first arrangement or the second arrangement structured in a non-vertical branch of the common vertical well extending from the common vertical well and the other one of the first arrangement or the second arrangement extending vertically within the common vertical well; and
generating a map of a subterranean formation from the analysis, the subterranean formation including a subterranean reservoir.

12. The method of claim 11, wherein the method includes activating one of a plurality of transmitters in the second arrangement, without activating the remaining transmitters in the second arrangement.

13. The method of claim 11, wherein the method includes measuring a voltage at each electromagnetic sensor in the first arrangement of electromagnetic sensors.

14. The method of claim 11, wherein the method includes using a processor to execute instructions in order to extract parameters of the subterranean reservoir from the signals received at the first arrangement.

15. The method of claim 11, wherein the method includes using a processor to execute instructions in order to measure and/or validate formation properties.

16. The method of claim 11, wherein the formation includes a subterranean reservoir and the method includes injecting a contrast fluid into the subterranean reservoir, such that effects of the contrast fluid on the subterranean reservoir can be observed.

17. The method of claim 16, wherein injecting a contrast fluid into the subterranean reservoir includes injecting a ferrofluid into the subterranean reservoir such that resistivity of the subterranean reservoir changes sufficiently to enhance contrast of the subterranean reservoir with respect to adjacent subterranean formations when analyzing signals received at the first arrangement of electromagnetic sensors in response to signals transmitted from the second arrangement.

18. The method of claim 16, wherein the method further includes tracking movement of the contrast fluid within the subterranean reservoir with respect to time.

19. The method of claim 18, wherein the method includes determining information about characteristics of the subterranean reservoir from the tracked contrast fluid.

20. The method of claim 16, wherein the method includes altering distribution of the contrast fluid by applying an electromagnetic field to the contrast fluid.

21. The method of claim 16, wherein the contrast fluid includes nanoscale ferromagnetic particles.

22. The method of claim 16, wherein the method includes displaying on a display an image generated from the mapping of the subterranean reservoir.

23. The method of claim 16, wherein the method includes directing a drilling operation using the analysis of the received signals or the map generated therefrom.

24. A machine-readable storage medium that stores instructions, which when read by a machine, can cause the machine to perform operations, the operations comprising:
choosing a set of transmitting sensors and a set of receiving sensors from a first arrangement of electromagnetic sensors and a second arrangement of electromagnetic sensors of a tool such that the electromagnetic sensors of the first arrangement electric or magnetic dipoles arranged to have a predetermined or selectable orientation and the electromagnetic sensors of the second arrangement have electric or magnetic dipoles arranged to have the orientation of the electric or magnetic dipoles of the first arrangement;
activating the set of transmitting sensors;
receiving signals in the set of receiving sensors in the first arrangement of electromagnetic sensors in response to activation of the set of transmitting sensors in the second arrangement of electromagnetic sensors;
analyzing signals received at the set of receiving sensors of the first arrangement of electromagnetic sensors of the tool in response to signals transmitted from the set of transmitting sensors of the second arrangement of the tool such that all electromagnetic sensors and transmitters of the tool are disposed below earth's surface, the first arrangement being disposed in and along a subterranean path which extends, at least in part, in a first direction and the second arrangement being disposed in and along another subterranean path which extends, at least in part, in a second direction, the second direction being different from the first direction, the first arrangement and the second arrangement being disposed in different non-vertical branches of a common vertical well extending from the common vertical well or the first arrangement and the second arrangement being disposed with one of the first arrangement or the second arrangement structured in a non-vertical branch of the common vertical well extending from the common vertical well and the other one of the first arrangement or the second arrangement extending vertically within the common vertical well; and
generating a map of a subterranean reservoir from the analysis.

25. The machine-readable storage medium of claim 24, wherein the operations further include activating one transmitter from a plurality of transmitters in the second arrangement, without activating remaining transmitters in the second arrangement.

26. The machine-readable storage medium of claim 24, wherein the operations further include measuring a voltage at each electromagnetic sensor in the first arrangement of electromagnetic sensors.

27. The machine-readable storage medium of claim 24, wherein the operations further include extracting or determining parameters of the subterranean reservoir using the signals received at the first arrangement.

28. The machine-readable storage medium of claim 24, wherein the operations further include applying inversion to the received signals and generating formation properties from the inversion.

29. The machine-readable storage medium of claim 24, wherein the operations further include planning, monitoring, controlling or directing a drilling operation using the analysis of the received signals or the generated map.

30. A method of analyzing a subterranean reservoir comprising:
choosing a set of transmitting sensors and a set of receiving sensors from a first arrangement of electromagnetic sensors and a second arrangement of electromagnetic sensors of a tool such that signals are received in the set of receiving sensors in the first arrangement of electromagnetic sensors in response to activation of the set of transmitting sensors in the second arrangement of electromagnetic sensors, wherein the electromagnetic sensors of the first arrangement have electric or magnetic dipoles arranged to have a predetermined or selectable orientation and the electromagnetic sensors of the second arrangement have electric or magnetic dipoles arranged to have the orientation of the electric or magnetic dipoles of the first arrangement;
receiving signals at the set of receiving sensors of the first arrangement of electromagnetic sensors of the tool in response to signals transmitted from the set of transmitting sensors of the second arrangement of the tool such that all electromagnetic sensors and transmitters of the tool are disposed below earth's surface, the first arrangement being disposed in and along a subterranean path which extends, at least in part, in a first direction and the second arrangement being disposed in and along another subterranean path which extends, at least in part, in a second direction, the second direction being different from the first direction, the first arrangement and the second arrangement being disposed in different non-vertical branches of a common vertical well extending from the common vertical well or the first arrangement and the second arrangement being disposed with one of the first arrangement or the second arrangement structured in a non-vertical branch of the common vertical well extending from the common vertical well and the other one of the first arrangement or the second arrangement extending vertically within the common vertical well; and
injecting a contrast fluid into the subterranean reservoir, such that effects of the contrast fluid on signals transmitted, from the set of transmitting sensors of the second arrangement, through or via the subterranean reservoir can be observed by a receiving sensor of the first arrangement of electromagnetic sensors, the contrast fluid containing nanoscale ferromagnetic particles.

31. The method of claim 30, wherein injecting a contrast fluid into the subterranean reservoir includes injecting a ferrofluid into the subterranean reservoir such that resistivity of the subterranean reservoir changes sufficiently to enhance contrast of the subterranean reservoir with respect to adjacent subterranean formations when analyzing signals received at the sensor from a transmitter.

32. The method of claim 30, wherein the method further includes tracking movement of the contrast fluid within the subterranean reservoir with respect to time.

33. The method of claim 32, wherein the method includes determining information about characteristics of the subterranean reservoir from the tracked contrast fluid.

34. The method of claim 30, wherein the method includes altering distribution of the contrast fluid within the subterranean reservoir by applying an electromagnetic field to the contrast fluid.

35. The method of claim 30, wherein the orientation is normal to layers of the subterranean formation in which the path of the first arrangement or the path of the second arrangement extends.

* * * * *